United States Patent [19]

Greber et al.

[11] 3,903,046

[45] Sept. 2, 1975

[54] PROCESS FOR THE PRODUCTION OF SHAPEABLE POLYMERS CONTAINING N-SILYL GROUPS

[75] Inventors: Gerd Greber, Binningen; Urs Gruber, Arlesheim; Martin Kuhn, Birsfelden; Dieter Lohmann, Pratteln; Sandor Gati, Birsfelden, all of Switzerland

[73] Assignee: Ciba-Geigy Corporation, Ardsley, N.Y.

[22] Filed: Dec. 11, 1973

[21] Appl. No.: 423,860

Related U.S. Application Data

[63] Continuation-in-part of Ser. No. 229,186, Feb. 24, 1972, abandoned.

[52] U.S. Cl. ........... 260/47 CP; 260/46.5 E; 260/65; 260/78 TF
[51] Int. Cl. ............................................. C08q 20/32
[58] Field of Search .. 260/47 CP, 65, 78 TF, 46.5 E

[56] References Cited
UNITED STATES PATENTS

| 3,303,157 | 2/1967 | Boldebuck et al. | 260/30.4 |
| 3,392,144 | 7/1968 | Holub | 260/46.5 |
| 3,440,204 | 4/1969 | Reinhard | 260/33.4 |
| 3,553,282 | 1/1971 | Holub | 260/82 A |
| 3,598,785 | 8/1971 | Holub et al. | 260/46.5 |
| 3,663,728 | 5/1972 | Hoback et al. | 260/29.2 |
| 3,673,155 | 6/1972 | Holub et al. | 260/65 |
| 3,779,990 | 12/1973 | Greber et al. | 260/47 CP |

*Primary Examiner*—Lester L. Lee
*Attorney, Agent, or Firm*—Vincent J. Cavalieri; Nestor W. Shust

[57] ABSTRACT

The invention relates to a process for the production of shapeable polymers containing N-silyl groups, of the polyamide, polyamide-imide and polyimide type, which polymers can be used for the production of shaped structures such as fibres, films, coatings, adhesives and the like. The polymers obtained by the process of this invention are distinguished by an inherent viscosity of from 0.1 to 4.0 dl/g and by their improved solubility in organic solvents which facilitates the processing of said polymers.

7 Claims, No Drawings

PROCESS FOR THE PRODUCTION OF SHAPEABLE POLYMERS CONTAINING N-SILYL GROUPS

This application is a continuation-in-part application of co-pending U.S. patent application Ser. No. 229,186, filed Feb. 24, 1972 now abandoned.

The present invention relates to a process for making polyamide or polyamide-acid polymers containing N-silyl groups, which can be shaped and are useful for the manufacture of industrial products, such as films, fibres, fibre-reinforced composite materials, laminates, ply structures, adhesives, foams, coating compositions and paper.

It is known that the conversion of certain polyamides disclosed in the literature, as well as of the so-called polyamide-acids from which the corresponding polyamideimides or polyimides are manufactured by cyclisation, to give films, fibres, ply structures, paper and the like, is associated with great difficulties, since these types of polyamides and the polyamide-acids are insoluble or inadequately soluble, in the customary processing media and/or show an excessively high viscosity.

It has now been found that the disadvantages mentioned above are avoided by shapeable polymers containing N-silyl groups which are soluble in organic solvents, preferably in chlorinated lower aliphatic hydrocarbons, especially methylene chloride, cycloaliphatic ketones, such as cyclohexanone, cyclic ethers, especially tetrahydrofurane, N,N-dialkylamides of lower monocarboxylic acids, such as dimethylformamide and dimethylacetamide, dialkylsulphoxides, such as dimethylsulphoxide, or cyclic amides, such as N-methylpyrrolidone. Thus the present invention relates to a process for making a polyamide or polyamide-acid polymer which contains N-silyl groups, is soluble in organic solvents, has an inherent viscosity at a concentration of 0.5 percent by weight in N,N-dimethylformamide, N,N-dimethylacetamide or N-methylpyrrolidone, measured at 25°C, of 0.1 to 4.0 dl/g, said polymer having a recurring structural unit of formula I

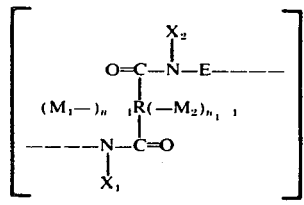
(I)

in which
R represents a radical which possesses at least one 5-membered or 6-membered cycloaliphatic, carbocyclicaromatic or heterocyclic ring, with the carbonyl groups being directly bonded to different ring carbon toms, $X_1$ and $X_2$ independently of one another represent hydrogen or a group of the formula

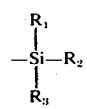

with $R_1$, $R_2$ and $R_3$ independently of one another each denoting an alkyl of 1 to 4 carbon atoms, a cycloalkyl, aryl or aralkyl radical, at least one of the radicals $X_1$ and $X_2$ in at least one of said structural units of formula I being

$M_1$ and $M_2$ denote a group of the formula

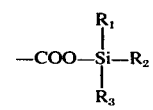

and are each located on a ring carbon atom adjacent to the carbonamide group, $R_1$, $R_2$ and $R_3$ having the meanings given above, $n_1$ and $n_2$ independently of one another denote the number 1 or 2, and E denotes a divalent carbocyclic-aromatic or heterocyclicaromatic radical, an aliphatic radical with at least 2 carbon atoms, a cycloaliphatic or araliphatic radical, or, if $n_1$ and/or $n_2$ is the number 2, the corresponding partially cyclised imide, which process is characterised in that a polyamide or a polyamide-acid having the recurring structural unit of formula II

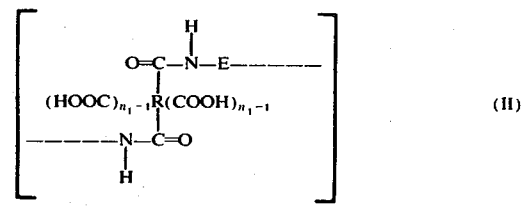
(II)

wherein
R, E, $n_1$ and $n_2$ are as defined under formula I, and the —COOH groups are each located on a ring carbon atom adjacent to the carbonamide group, or, if $n_1$ and/or $n_2$ is the number 2, the corresponding partially cyclised imide, is reacted, at a temperature of from about 0°C to 200°C, a. with a silylating agent introducing radicals of the formula

into the —COOH and —CONH groups, in an amount sufficient to silylate any —COOH groups present and at least one —CONH group in at least one of said structural units of formula II, said silylating agent being of formula XV

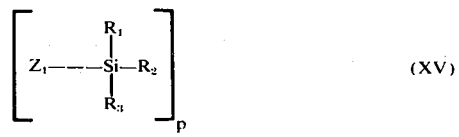
(XV)

wherein
R₁, R₂ and R₃ have the meanings given under formula I,
p represents the number 1, 2 or 4,
Z₁, if p is the number 1, represents

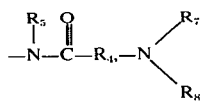

or

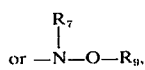

or, if p is the number 2, Z₁ represents

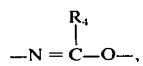

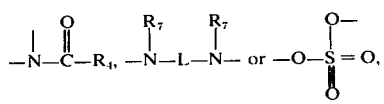

or, if p is the number 4, Z₁ represents

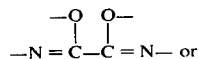

or

with
R₄ denoting hydrogen, trifluoromethyl, an alkyl of 1 to 4 carbon atoms, a cycloalkyl, aryl or aralkyl radical,
R₅ denoting hydrogen, an alkyl of 1 to 4 carbon atoms, a cycloalkyl, aryl or aralkyl radical,
R₇ and R₈ independently of one another denoting hydrogen, an alkyl of 1 to 4 carbon atoms, a cycloakyl, aryl or aralkyl radical or a

radical,
R₉ denoting alkyl of 1 to 4 carbon atoms, a cycloalkyl, aryl or aralkyl radical or a

radical, and

L denoting phenylene or alkylene with 2 to 10 carbon atoms, or b. if n₁ and/or n₂ is the number 2, first with a silylating agent introducing radicals of the formula

into the —COOH groups, in an amount sufficient to silylate all of the free carboxyl groups, said silylating agent being of formula XVI

 (XVI)

wherein
R₁, R₂ and R₃ have the meanings given under formula I,
q represents the number 1 or 2,
Z₂, if q is the number 1, represents halogen,

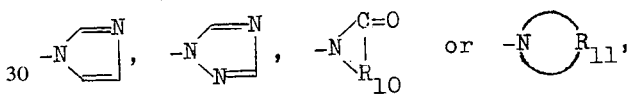

or, if q is the number 2, Z₂ represents

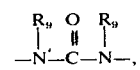

with
R₉ having the meanings given under formula XV,
R₁₀ denoting an alkylene radical with 3 to 12 carbon atoms, and
R₁₁ denoting an alkylene radical with 2 to 12 carbon atoms which alkylene radical may contain O or S atoms, and then reacting the resultant polymer with a silylating agent of formula XV, introducing radicals of the formula

into the —CONH groups, in an amount sufficient to silylate at least one carbonamide group in at least one of said structural units of formula II.

Here and in the following text, "lower" in conjunction with alkyl or alkoxy groups, aliphatic hydrocarbons and aliphatic monocarboxylic acids designates such radicals, hydrocarbons or acids with 1 to 4 carbon atoms.

The polymers containing N-silyl groups, manufactured according to the invention, are physically characterised by the inherent viscosity $\eta_{inh.}$, which is calculated in accordance with the following equation:

$$\eta\text{inh.} = \frac{\ln \frac{\eta}{\eta o}}{c}$$

In this equation the symbols have the following meanings:

$\ln$ = natural logarithm $\eta$ = viscosity of the solution (0.5% by weight of the polymer in a suitable solvent, for example N,N-dimethylacetamide, N,N-dimethylformamide or N-methylpyrrolidone), $\eta$ = viscosity of the solvent, and $c$ = concentration of the polymer solution in g of polymer/100 ml of solvent.

The viscosities are measured at 25°C. As is generally known, the inherent viscosity is a measure of the molecular weight of a polymer.

The polyamides and polyamide-acids of the formula II which can be used in the process according to the invention are in themselves known or can be manufactured in a known manner.

In the formulae I and II R, when denoting a carbocyclicaromatic radical, especially represents a monocyclic radical, a condensed polycyclic radical or a polycyclic radical with several cyclic, condensed or non-condensed systems, which can be bonded to one another directly or via bridge members.

As examples of suitable bridge members there may be mentioned: —O—, —CH$_2$—CH$_2$—, —CH$_2$—, —CH=CH—,

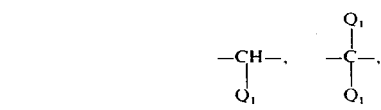

—C$_3$F$_6$—, —S—, —SO—, —SO$_2$—,

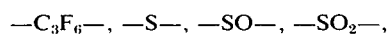

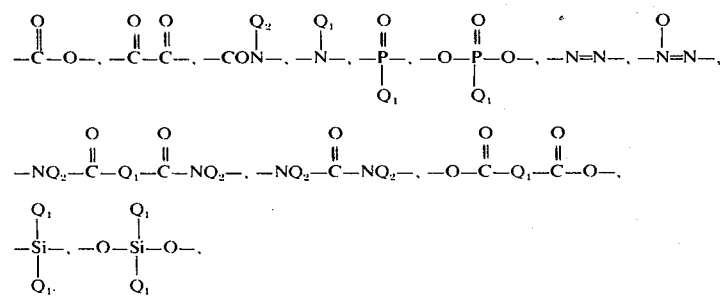

wherein $Q_1$ represents an alkyl radical with 1 to 6, preferably 1 to 4, carbon atoms, which can optionally be substituted by halogen atoms, preferably fluorine, or a cycloalkyl or an aryl radical and $Q_2$ represents hydorgen, an alkyl radical with 1 to 4 carbon atoms which can optionally be substituted by halogen atoms, or a cycloalkyl radical or an aryl radical. Such radicals can also be bonded to one another via two bridge members, such as two —SO$_2$—groups.

If R in the formulae I and II represents a heterocyclic radical, this can in particular be a heterocyclic-aromatic ring system which is optionally benzocondensed and contains O, N and/or S.

Cycloaliphatic, carbocyclic-aromatic or heterocyclic radicals represented by R can also be substituted for example by nitro groups lower alkyl groups, trifluoromethyl groups, halogen atoms, especially fluorine, sulphamoyl, N-lower alkylamino, N,N-di-lower alkylamino or N-phenylamino groups and silyl groups.

If $n_1$ and $n_2$ represent the number 2, R in the above formulae preferably denotes the benzene ring or the benzophenone ring system, $X_1$ and $X_2$ independently of one another denote hydrogen or a radical of the formula

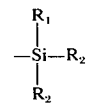

and M$_1$ M$_2$ denote a

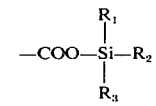

radical with R$_1$, R$_2$ and R$_3$ independently of one another each denoting an alkyl radical with 1 to 4 carbon atoms, each denoting especially methyl, and E denotes a benzene ring, a 4,4'-diphenylylsulphone or 4,4'-diphenylylene radical and especially a 4,4'-diphenylylether radical.

According to a further preference, R represents the benzene ring if $n_1$ denotes the number 2 and $n_2$ denotes the number 1, whilst $X_1$, $X_2$, M$_1$, R$_1$, R$_2$, R$_3$ and E have the abovementioned preferred meaning.

Finally, R and E preferably each represent a benzene ring, $X_1$ and $X_2$ denote hydrogen or a radical of the formula

and $R_1$, $R_2$ and $R_3$ independently of one another each represent an alkyl radical of 1 to 4 carbon atoms and especially each represent methyl, if $n_1$ and $n_2$ denote the number 1.

To manufacture compounds of the formula II, in which $n_1$ and $n_2$ each denote the number 1, dicarboxylic acid halides are preferably used, for example thiophene-2,5-dicarboxylic acid dichloride, benzo[1,2-d:5,4-d']bisoxazole-2,6-dicarboxylic acid dichloride, and especially isophthalic acid dichloride or terephthalic acid dichloride; instead of the acid halides, the free carboxylic acids or their esters can also be employed. For the manufacture of polyamide-acids of the formula II in which one n denotes number 2 and the other n denotes number 1, it is possible in particular to use trimellitic anhydride and 4-chloroformyl-phthalic anhydride. Tetracarboxylic acid derivatives, preferably in the form of their anhydrides, are employed for the manufacture of polyamide-acids of the formula II in which both $n_1$ and $n_2$ denote the number 2..

As example of suitable tetracarboxylic acid dianhydrides of this nature there may be mentioned; pyromellitic acid dianhydride, 3,3'4,4'-benzophenone-tetracarboxylic acid dianhydride, 2,3,3',4'-benzophenone-tetracarboxylic acid dianhydride, 2,2',-3,3'-benzophenone-tetracarboxylic acid dianhydride, 4,4',5,5',6,6'-hexafluorobenzophenone-2,2',3,3'-tetracarboxylic acid dianhydride, 3,3',4,4'-diphenyl-tetracarboxylic acid dianhydride, 2,2',3,3'-diphenyl-tetracarboxylic acid dianhydride,bis-(2,3-dicarboxyphenyl)-methane dianhydride, bis-(3,4-dicarboxyphenyl)-methane dianhydride,bis-(2,5,6-trifluoro-3,4-dicarboxyphenyl)-methane dianhydride,1,1-bis-(3,4-dicarboxyphenyl)-ethane dianhydride,2,2-bis-(3,4-dicarboxyphenyl)-propane dianhydride,2,2-bis-(2,3-dicarboxyphenyl)- propane dianhydride, bis-(3,4-dicarboxyphenyl)-ether dianhydride, bis-(2,3-dicarboxyphenyl)-ether dianhydride, bis-(2,5,6-trifluoro-2,4-dicarboxyphenyl)-ether dianhydride, bis-(3,4-dicarboxyphenyl)-sulphone dianhydride, bis-(2,5,6-trifluoro-3,4-dicarboxyphenyl)-sulphone dianhydride, bis-(3,4-dicarboxyphenyl)-phenylphosphonate dianhydride, bis-(3,4-dicarboxyphenyl)-phenylphosphine oxide dianhydride, N,N-(3,4-dicarboxyphenyl)-N-methylamine dianhydride, bis-(3,4-dicarboxyphenyl)-diethylsilane dianhydride, bis-(3,4-dicarboxyphenyl)-tetramethyldisiloxane dianhydride, 3,3',4,4'-tetracarboxybenzoyloxybenzene dianhydride, 1,4,5,8-naphthalene-tetracarboxylic acid dianhydride, 2,3,6,7-naphthalene-tetracarboxylic acid dianhydride, 1,2,5,6-naphthalene-tetracarboxylic acid dianhydride, 2,6-dichloronaphthalene-1,4,5,8-tetracarboxylic acid dianhydride, 2,7-dichloronaphthalene-1,4,5,8-tetracarboxylic acid dianhydride, 2,3,6,7-tetrachloronaphthalene-1,4,5,8-tetracarboxylic acid dianhydride, 1,4,5,8-tetrafluoronaphthalene-2,3,6,7-tetracarboxylic acid dianhydride, phenanthrene-1,8,9,10-tetracarboxylic acid dianhydride, 3,4,9,10-perylenetetracarboxylic acid dianhydride, thiophene-2,3,4,5-tetracarboxylic acid dianhydride, pyrazine-2,3,5,6-tetracarboxylic acid dianhydride, pyridine-2,3,5,6-tetracarboxylic acid dianhydride, tetrahydrofurane-2,3,4,5-tetracarboxylic acid dianhydride, 3,3',4,4'-azobenzene-tetracarboxylic acid dianhydride, 3,3'4,-4'-azoxybenzene-tetracarboxylic acid dianhydride, 1,2-,3,4-cyclopentanetetracarboxylic acid dianhydride as well as dianhydrides of the general formula

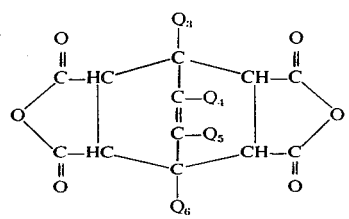

in which $Q_3$, $Q_4$, $Q_5$ and $Q_6$ independently of one another denote hydrogen, halogen, alkyl, cycloalkyl, phenyl, aralkyl, acyl or an optionally esterified or etherified hydroxyl group, for example bicyclo[2,2,2]oct-7-ene-2,3,5,6-tetracarboxylic acid dianhydride.

Instead of the abovementioned anhydrides, the free carboxylic acids or the corresponding acid chlorides or esters can also be employed in the process according to the invention. Pyromellitic acid dianhydride and benzophenonetetracarboxylic acid dianhydrides are preferred.

To manufacture the polyamides or polyamide-acids of the formula II, the optionally substituted carbocyclic-aromatic, heterocyclic-aromatic, aliphatic, cycloaliphatic or araliphatic diamines of the general formula $H_2N$—E—$NH_2$, which are known from the literature, can be used.

Possible carbocyclic-aromatic diamines of the general formula $H_2N$—E—$NH_2$ are compounds in which E represents one or more carbocyclic-aromatic radicals bonded to one another directly or via bridge members, these radicals being optionally substituted further, for example by alkyl or alkoxy groups with 1–4 carbon atoms, or by halogen atoms, especially fluorine. Possible bridge members are the groups mentioned above when discussing R. As specific examples of carbocyclic-aromatic diamines there may be mentioned: o-, m- and p-phenylenediamine, diaminotoluenes, such as 2,4-diaminotoluene, 1,4-diamino-2-methoxybenzene, 2,5-diaminoxylene, 1,4-diamino-2,5-dichlorobenzene, 1,4-diamino-2-bromobenzene, 4-isopropyl-m-phenylenediamine, 2,4'- or 4,4'-diaminodiphenyl, 3,3'-dimethyl-4,4'-diaminodiphenyl, 3,3'-dimethoxy-4,4'-diaminodiphenyl, 3,3'-diamino-2,2',4,4',5,5',6,6'-octafluorodiphenyl, 4,4'-diamino-2,2',3,3',5,5',6,6'-octafluorodiphenyl, 3,3'-dichloro-4,4'-diaminodiphenyl, 4,4'-diaminodiphenyl-2,2-propane, 4,4'-diamino-diphenylmethane, 2,2'- or 4,4'-diaminostilbene, 4,4'-diamino-2,2',3,3',5,5',6,6'-octafluorodiphenylmethane, 4,4'-diaminodiphenyl-ether, 4,4'-diamino-2,2',3,3',5,5',6,6'-octafluorodiphenyl-ether, 4,4'-diaminodiphenylthioether, 4,4'-diaminodiphenylsulphone, 3,3'-diaminodiphenylsulphone, 4,4' -diaminobenzoic acid phenyl ester, 2,2'- or 4,4'- diaminobenzophenone, 4,4'-diaminobenzil, 4-(4'-aminophenylcarbamoyl)-aniline, bis-(4-aminophenyl)-phosphine oxide, bis-(4-aminophenyl)-methylphosphine oxide, bis-(3-aminophenyl)-methylphosphine oxide, bis-(4-aminophenyl)-phenylphosphine oxide, bis-(4-aminophenyl)-cyclohexylphosphine oxide, N,N-bis-4-amino-phenyl-N-phenylamine, N,N-bis-4-aminophenyl-N-methylamine, 4,4'-diaminodiphenylamine, para-bis-(2-methyl-4-aminophenyl)-benzene, 2,2'-, 3,3'- or 4,4'-diaminoazobenzene, 4,4'-diaminodiphenylurea, 1,8- or 4,5-diaminonaphthalene, 1,5-diaminoanthraquinone, diamino-fluoroanthene, 3,9-diaminochrysene, diamino-pyrene, bis-(4-aminophenyl)-diethylsilane, bis-(4-aminophenyl)-dimethylsilane and bis-(4-aminophenyl)-tetramethyldisiloxane.

o-, m- and p-phenylenediamines, 4,4'-diaminodiphenyl, 4,4'-diaminodiphenylsulphone and especially 4,4'-diaminodiphenylether, which are optionally substituted by lower alkyl or alkoxy groups or halogen atoms, are particularly preferred.

As a further class of suitable diamines there may be mentioned the compounds of the general formula $H_2N-E-NH_2$ described in French Pat. No. 1,539,074, in which E represents a radical of the formula

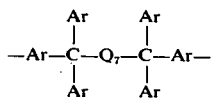

wherein Ar represents a carbocyclic-aromatic radical, especially the unsubstituted phenyl radical and $Q_7$ represents a radical with at least two carbocyclic-aromatic rings of which each is directly bonded to one of the C atoms indicated in the formula, especially a radical of the formula

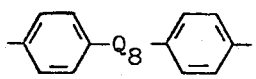

wherein $Q_8$ preferably has the meaning of $-O-$, $-S-$, $-CH_2-$,

or $-N=N-$.

Possible aliphatic diamines are especially optionally substituted alkylenediamines. The alkylene chain of such diamines can also be interrupted by hetero-atoms, such as O, S or N atoms. Examples of such compounds are: di-, tri-, tetra-, hexa-, hepta-, octa-, nona- and deca-methylenediamine, 2,2-dimethylpropylenediamine, 2,5-dimethylhexamethylenediamine, 2,5-dimethylheptamethylenediamine, 4,4-dimethylheptamethylenediamine, 3-methylheptamethylenediamine, 3-methoxyhexamethylenediamine, 5-methylnonamethylenediamine, 2,11-diaminododecane, 1,12-diaminooctadecane and 1,2-bis-(3-aminopropoxy)-ethane as well as the diamines of the formulae $H_2N(CH_2)_3O(CH_2)_2O(CH_2)_3NH_2$, $H_2N(CH_2)_3S(CH_2)_3NH_2$ and $H_2N(CH_2)_3N(CH_3)(CH_2)_3NH_2$.

Finally, 1,4-diaminocyclohexane and 4,4'-diaminodicyclohexylmethane may be mentioned as suitable cycloaliphatic diamines and 1,4-bis-(2-methyl-4-aminopentyl)-benzene, 1,4-bis-(1,1-dimethyl-5-aminopentyl)-benzene, 1,3- or 1,4-bis-(aminomethyl)-benzene, 2,4-bis-[(2'-amino-1',1'-dimethyl)-ethyl]-toluene and bis-[4-(2'-amino-1',1'dimethyl)-ethylphenyl]-ether may be mentioned as suitable araliphatic diamines.

Possible heterocyclic-aromatic diamines are the known 5-membered or 6-membered compounds containing O, N and/or S, for example 2,6-diaminopyridine, 2,4-diaminopyrimidine, 3,6-diaminoacridine, 2,4-diamino-s-triazine, 2,7-diaminodibenzofurane, 2,7-diaminocarbazole, 3,7-diaminophenothiazine, 5,6-diamino-1,3-dimethyl-uracil and 2,5-diamino-1,3,4-thiadiazole.

As agents which introduce the radical

and which are capable of silylating amide protons, it is possible to use, in the process according to the invention, silylating agents which are in themselves known, especially compounds of the following classes:

1. Amides of the general formulae IIIa or IIIb

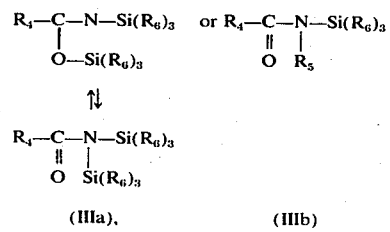

in which $R_4$ denotes hydrogen, the trifluoromethyl radical, a lower alkyl, a cycloalkyl, aryl or aralkyl radical, $R_5$ denotes hydrogen, a lower alkyl, a cycloalkyl, aryl or aralkyl radical and $R_6$ each indepedently of one another denotes a lower alkyl, a cycloalkyl, aryl or aralkyl radical.

As examples of suitable compounds of the formulae IIIa or IIIb there may be mentioned: bis-trimethylsilylacetamide, bis-triethylsilylacetamide, N-methyl-N-trimethylsilylacetamide, bis-trimethylsilylformamide, bis-trimethylsilyltrifluoroacetamide, bis-trimethylsilylbenzamide, bis-trimethylsilyl-p-methoxy-benzamide and bis-trimethylsilyltolylamide.

Apart from the abovementioned amides, bis-trimethylsilylacrylamide can also be used for the silylation of amide protons.

2. Amines of the general formula IV

in which $R_6$ has the meaning given under formula IIIa or IIIb and $R_7$ and $R_8$ independently of one another denote hydrogen, a lower alkyl, a cycloalkyl, aryl or aralkyl radical or a $(R_6)_3$-Si radical As examples of suitable compounds of the formula IV there may be mentioned: trimethylsilylamine, N,N-diethyltrimethylsilylamine, N-ethyl-trimethylsilylamine, N,N-diethyl-triphenylsilylamine, N-phenyl-triethylsilylamine, N-cyclohexyl-trimethylsilylamine, N,N-dibenzyl-trimethylsilylamine, N,N-diethyl-dimethyl-ethylsilylamine, N,N-diphenyl-trimethylsilylamine, N-methyl-N-phenyl-trimethylsilylamine, N-ethyl-N-phenyl-trimethylsilylamine, N-methyl-N-cyclohexyltrimethylsilylamine, hexamethyldisilazane und N,N-bis(trimethylsilyl)aniline.

3. Diamines of the general formula V

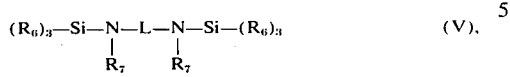 (V), in which

R$_6$ and R$_7$ have the meanings indicated under the formulae IIIa and IIIb or IV, and L represents a phenylene radical or an alkylene radical with 2 to 10 carbon atoms.

Examples of such compounds are: 1,4-bis-(trimethylsilylamino)-benzene, 1,4-bis-(ditrimethylsilylamino)-benzene, 1,4-bis-(N-methyl-N-trimethylsilylamino)-benzene and 1,6-bis-(trimethylsilylamino)-hexane.

4. O-substituted hydroxylamines of the general formula VI

 (VI), in which

R$_6$ and R$_7$ have the abovementioned meanings and

R$_9$ represents a lower alkyl, a cycloalkyl, aryl or aralkyl radical or a -Si(R$_6$)$_3$ radical.

As examples there may be mentioned: N-methyl-N-ethoxytrimethylsilylamine, N-phenoxytrimethylsilylamine and N-methyl-N-trimethylsiloxytrimethylsilylamine.

5. Compounds of the general formulae VII

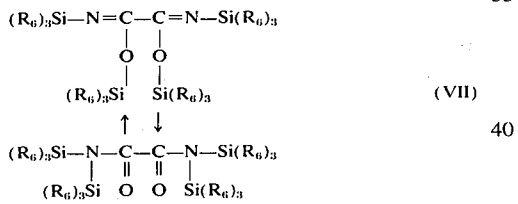 (VII)

in which

R$_6$ has the meaning indicated under formula IIIa or IIIb, such as tetrakis-(trimethylsilyl)-oxamide and tetrakis(triethylsilyl)-oxamide.

6. Compounds of the general formula VIII

 (VIII), in which

R$_6$ has the meaning indicated under formula IIIa or IIIb, such as bis-(trimethylsilyl)-sulphate or bis-(triphenylsilyl)-sulphate.

Amides of the formula IIIa or IIIb or amines of the formula IV, above all bis-trimethylsilylacetamide and N-methyl-N-trimethylsilylacetamide, are in particular suitable for the silylation of amide protons. By means of the silylating agents hitherto mentioned, it is possible to silylate not only amide protons but also carboxyl protons.

For the silylation of carboxyl protons alone, that is to say for the introduction of radicals of the formula

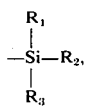

in which

R$_1$, R$_2$ and R$_3$ have the meaning indicated under formula I, it is possible to use, in principle, any desired N-Si compounds, inter alia also amines of the general formula IV, in which R$_6$ can additionally represent a lower alkoxy group or a phenoxy group, for example N,N-diethyltrimethoxysilylamine or N,N-diethyltriphenoxysilylamine, as well as N-trimethylsilylacrylamide and also compounds of the following classes:

a. Halides of the general formula IX

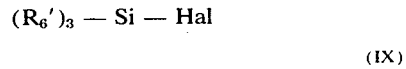 (IX)

in which

R$_6$' denotes an alkyl group with up to 12 carbon atoms or a cycloalkyl, aryl, aralkyl, lower alkoxy or aryloxy group and Hal denotes fluorine, chlorine or bromine.

As examples there may be mentioned: trimethoxychlorosilane, trimethylchlorosilane, triphenylbromosilane, methyldiethylbromosilane, triphenylchlorosilane, tritolylbromosilane, triethylchlorosilane, tribenzylchlorosilane, tricyclohexylchlorosilane, trioctylchlorosilane, triphenoxychlorosilane, tridodecylbromosilane and dimethylnaphthylchlorosilane.

b. Ureas of the general formula X

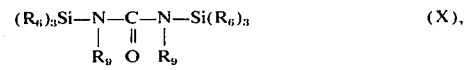 (X), in which

R$_6$ and R$_9$ have the abovementioned meanings, such as N,N'-dimethyl-N,N'-ditrimethylsilylurea, N,N'-diphenyl-N,N'-ditrimethylsilylurea and N,N'-bis-(trimethylsilyl)-urea.

c. Imidazoles and 1,2,4-triazoles of the general formula XI and XII

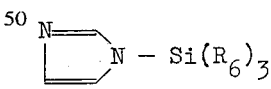

(XI)

and 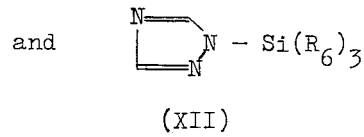

(XII)

in which

R$_6$ has the meaning indicated under formula IIIa or IIIb, such as imidazolyl-1-trimethylsilane, imidazolyl-1-triethylsilane, imidazolyl-1-triphenylsilane, 1,2,4-triazolyl-1-trimethylsilane and 1,2,4-triazolyl-1-diethylmethylsilane.

d. Lactams of the general formula XIII

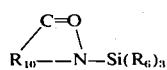 (XIII)

in which
R$_6$ has the meaning indicated under the formula IIIa or IIIb and
R$_{10}$ represents a bifunctional alkylene radical with 3–12 carbon atoms, such as N-trimethylsilylpyrrolidone, N-triphenylsilylpiperidone and N-triethylsilyl-ε-caprolactam.

e. Cyclic amines of the general formula XIV

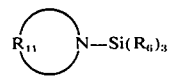 (XIV), in which
R$_6$ has the meaning indicated under formula IIIa or IIIb and
R$_{11}$ represents a bifunctional alkylene radical with 2-12 carbon atoms which optionally contains further heteroatoms, such as O or S, for example N-trimethylsilylpyrrolidine, N-triphenylsilylpiperidine, N-methyldiethylsilylmorpholine, N-trimethylsilylmorpholine and N-trimethylsilyltetrahydro-1,4-thiazine. If halides of the formula IX are used for the silylation of carboxyl protons, acid-binding agents, such as tertiary amines, ammonium carbonate or ammonium bicarbonate are advantageously added to the reaction mixture.

To manufacture polymers which contain N-silyl groups and which have recurring structural units of the general formula I wherein at least one of $n_1$ and $n_2$ denotes the number 2, the silylation can advantageously be carried out by reacting a polyamide-acid having recurring structural units of the general formula II, in which at least one of $n_1$ and $n_2$ denotes the number 2, firstly with a silylating agent of formula XVI, which introduces radicals of the formula

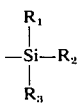

into the carboxyl groups, and subsequently with a silylating agent of formula XV, which introduces radicals of the formula

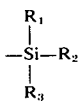

into the amide groups, with R$_1$, R$_2$ and R$_3$ having the meaning indicated under formula I. This stepwise silylation permits partial replacement of the silylating agents of formula XV by more simply accessible compounds, especially those of formula IX, above all trimethylchlorosilane.

The degree of silylation of the end products can be varied as desired, depending on the amount of the agent employed for the silylation of amide protons. The solubility of incompletely silylated polyamide-acids in the customary organic solvents increases with increasing degree of silylation of the amide groups.

Thus it may be desirable, depending on the intended further use, only to silylate an amide proton in about every 7th to 10th polyamide or polyamide-acid structural unit. The silylated polyamide or polyamide-acid solutions thereby obtained have a better solubility than the corresponding non-silylated solutions; furthermore, partially silylated polyamide-acid solutions are more stable to cyclisation than corresponding persilylated solutions:

The reaction of the polyamides or polyamide-acids with the silylating agent is appropriately carried out in an organic aprotic solvent which is inert towards the reactant and contains at least one hetero-atom, at temperatures between approx. 0°C and 200°C, preferably between 20° and 200°C in the case of polyamides and between 10° and 100°C in the case of polyamide-acids. Per amide group to be silylated, the silylating agent is employed in at least stoichiometric amount, but appropriately in a 1.5-fold to 20-fold molecular excess, depending on the type of silylating agent used. As examples of suitable solvents there may be mentioned: N,N-dimethylacetamide, N,N-diethylacetamide, N,N-dimethylformamide, N,N-dimethylmethoxyacetamide, N-methyl-2-pyrrolidone, N-acetyl-2-pyrrolidone, N-methyl-ε-caprolactam, hexamethylphosphoric acid triamide (hexametapol),N,N,N',N'-tetramethylurea, tetrahydrothiophene dioxide and dimethylsulphoxide. The reaction can also be carried out in mixtures of such solvents. These preferred solvent systems can, hoowever, also be used diluted by the addition of other organic aprotic solvents, such as aromatic, cycloaliphatic or aliphatic, optionally chlorinated hydrocarbons, for example benzene, toluene, xylenes, cyclohexane, pentane, hexane, petroleum ether, methylene chloride, tetrahydrofurane, cyclohexanone and dioxane. However, if the reaction is carried out in such mixtures, the solvent ratio must be so chosen that the silylated polyamide or silylated polyamide-acid produced is not precipitated. Dimethylsulphoxide, N,N-dimethylacetamide, N,N-dimethylformamide and N-methylpyrrolidone are preferred as solvents.

If desired, these solvents can be removed in the usual manner after completion of the reaction, for example by distilling off, if desired under reduced pressure. Polymers silylated according to the invention can, however, also be precipitated in a manner which is in itself known, by pouring the reaction solution into a precipitant, such as aliphatic hydrocarbons, especially petroleum ether, double ethers of monoethylene glycol, diethylene glycol or triethylene glycol or acetonitrile and the like, and can be dried if desired.

N-silylated polymers manufactured according to the invention are —in contrast to the corresponding non-silylated polyamides or polyamide-acids— readily soluble in a large number of organic solvents, for example in optionally halogenated aromatic hydrocarbons, halogenated lower aliphatic hydrocarbons, cycloaliphatic hydrocarbons, aliphatic or cycloaliphatic ketones, cyclic ethers, amides of lower aliphatic carboxylic acids and alkyl esters of lower aliphatic carboxylic acids, as well as the remaining abovementioned aprotic solvents containing hetero-atoms. As examples there may be mentioned: benzene, toluene, xylene, chlorobenzene, dichlorobenzene, trichlorobenzene,tetrahydronaphthalene, chloroform, carbon tetrachloride, trichloroethylene and tetrachloroethylene, dichloroethane, trichloroethane and tetrachloroethane, methylene chloride, dichloromethane, acetone, methyl ethyl ketone, cyclopentanone, cyclohexanone, tetrahydrofurane, tetrahydropyrane, dioxane, ethyl acetate and butyl acetate.

Preferably, chlorinated lower aliphatic hydrocarbons, especially methylene chloride, cycloaliphatic ketones, such as cyclohexanone, cyclic ethers, especially tetrahydrofurane, N,N-dialkylamides of lower monocarboxylic acids, such as dimethylformamide and dimethylacetamide, dialkyl sulphoxides, such as dimethylsulphoxide, or cyclic amides, such as N-methylpyrrolidone, are used for the further processing of the silylated polyamides or polyamide-acids.

Since polyamides or polyamide-acids which have been silylated according to the invention are soluble in the customary organic solvents, the polymerisation and silylating reaction can be carried out in very highly concentrated solutions, for example in highly concentrated dimethylacetamide solution. This presents the possibility of subsequently diluting the solutions, for example with low-boiling solvents, such as benzene, toluene, xylenes, tetrahydrofurane, dioxane, cyclohexanone or methylene chloride, without the concentration of the resulting solutions becoming too low for further use. These solutions are of relatively low viscosity and are therefore well suited, for example, to laminating purposes.

Solutions of polyamides or polyamide-acids which have been silylated, especially persilylated, according to the invention, have a substantially lower viscosity than the corresponding solutions of non-silylated polyamides or polyamide-acids. This effect can be utilised, for example, for reducing the high viscosities of even only slightly concentrated solutions of very high molecular polyamide-acids, in the desired manner. On the other hand, this effect permits the manufacture of relatively concentrated solutions of silylated polyamide-acids (between 40 and 60 percent by weight solutions, depending on the degree of polymerisation), which are easily processable because of their low viscosity. This for example ensures, when laminating glass fibres or carbon fibres, that whilst the solutions have sufficiently high flow, adequate material can be applied in a single process step. The viscosity of solutions of non-silylated polyamide-acids of comparable molecular weight distribution, on the other hand, is already so high at concentrations below 20 percent by weight (b.w.) that they barely still flow.

N-silylated polymers manufactured in accordance with the invention, can be desilylated in various ways and thus converted into the corresponding polyamides, polyamide-imides and polyimides. The hydrolysis-sensitive N-silyl groups in N-silylated polymers in whose structural units $n_1$ and $n_2$ are the number 1, are appropriately split off in the presence of proton donors, such as water, alcohols or carboxylic acids. This can, for example, be effected by precipitating such polymers from their solutions by adding water, alcohols, for example methanol or ethanol, or water-alcohol mixtures at between 0° and 100°C, or by treating the isolated polymers containing silyl groups with such precipitants at the indicated temperatures, or with steam. In certain cases it suffices to expose the silylated polymers to atmospheric moisture.

Polymers containing N-silyl groups in whose structural units $n_1$ is 2 and $n_2$ is 1, are first cyclised dry or in solution, by heating to temperatures of above 30°C, preferably 30° to approx. 260°C, for a few seconds to several hours, whilst splitting off silanols or disiloxanes, after which the remaining N-silyl groups are split off in the presence of proton donors as in the case of the polyamides. Hydrogen atoms or silyl radicals, bonded to the amide nitrogen and capable of imide formation, which may still be present after the heating process, can be split off in a manner which is in itself known, thermally or chemically, for example by treatment with acetic anhydride.

Polymers containing N-silyl groups in whose structural units $n_1$ and $n_2$ are 2, can be cyclised by heating, analogously to polymers with structural units wherein $n_1$ is 2 and $n_2$ is 1. In both cases the cyclisation, on addition of catalytic amounts of a base, such as diethylamine, triethylamine or pyridine, already largely takes place at room temperature.

For this reason, if premature cyclisation is to be avoided, only such silylating agents are used, if desired, for the silylation of polyamide-acids as do not form any strongly basic nitrogen compounds during the trans-silylation reaction with the polymers, as, for example, when using N,N-diethyl-trimethylsilylamine.

An improvement in the heat resistance and resistance to hydrolysis can in certain cases be achieved by further heating the polyamide-imides or polyimides obtained for a short time to temperatures of about 300°–350°C.

In contrast to the cyclisation of non-silylated polyamide-acids, inert disiloxane compounds are eliminated instead of water during the desilylation of polyamide-acids which have been persilylated according to the invention. This makes hydrolytic degradation of the polyamide-acid molecules impossible during the cyclisation. Furthermore, the cyclisation of persilylated polyamide-acids in many cases takes place at relatively low temperatures, especially at between 80° and 150°C, whilst temperatures of at least 250°C are required for the cyclisation of corresponding non-silylated polyamide-acids.

The silanols or disiloxanes produced during the conversion of the polymers containing N-silyl groups, manufactured according to the invention, into the corresponding polyamides, polyamide-imides and polyimides can be removed relatively easily together with the solvent, in the usual manner.

As a result of their good solubility in a large number of low-boiling solvents, the polymers containing N-silyl groups, manufactured according to the invention can be processed particularly easily and can therefore be used in a manner which is in itself known, but is technically simple, for the manufacture of industrial products, especially for the manufacture of films (sheets), fibres, fibre-reinforced composite materials, laminates, ply structures, castings, honeycomb core material, adhesives, foams, coating compositions or paper and the like.

Polymers containing N-silyl groups in which $n_1$ any $n_2$ are 1, are above all suitable, especially in the form of solutions in a solvent which does not split off the silyl radicals, for the manufacture of fibres, foams, paper, coating compositions and laminates, and very especially of films and sheets, the N-silyl groups being split off in the manner described above during or after processing.

Polymers which contain N-silyl groups in whose structural units $n_1$ is 2 and $n_2$ is 1, can be used, especially in the form of solutions in a solvent which does not split off the silyl radicals, for the manufacture of fibres and particularly of films and sheets, of coating compositions, especially heat-resistant wire enamels, and of ply structures, whilst polymers containing N-silyl groups in whose structural units $n_1$ and $n_2$ and 2, are particularly suitable, also usually in the form of solutions in a solvent which does not split off the silyl radicals, for the manufacture of foams, coating compositions, such as heat-stable wire enamels, of shaped articles, especially films and sheets, of adhesives, laminates, fibres and as the matrix for fibre-reinforced composite materials. In all applications, the polymers containing N-silyl groups are converted into the corresponding polyamide-imides or polyimides in the manner described above, in situ, after or during processing.

Polymers containing N-silyl groups manufactured according to the invention are preferably used in the form of solutions in one of the above-mentioned solvents which do not split off the silyl radicals. N-silylated polyamideimides and especially N-silylated aromatic polyamides, for example poly-(m-phenylene-isophthalamide), can, in contrast to the corresponding non-silylated compounds, also be converted in the molten form, for example into films, fibres and the like.

For the manufacture of shaped articles and compositions such as films, sheets, fibres, fibre-reinforced ply materials, laminates, paper, foams, coating compositions, castings and adhesives, it is possible to add to the polymers containing silyl groups, before or after shaping, customary additives such as pigments, fillers, electrical conductors, for example carbon black or metal particles, agents for increasing the abrasion resistance, lubricants or reinforcing fibres, for example carbon, boron or glass fibres. Foams are obtained, for example, by adding customary blowing agents and, if desired, fillers to the silylated polymers before working up, or blowing a gas such as air, carbon dioxide or nitrogen into the polymer composition or polymer solution. Ply structures which contain polymers can, if appropriate, be provided with coating layers which improve their surface properties, for example surface layers of phenolic resins or aluminium, and can be used, inter alia, in aircraft construction.

The polymers containing silyl groups, preferably in the form of solutions, can also be used as coating compositions and adhesives, optionally with the addition of pigments, such as titanium dioxide, customary fillers and foaming agents, for coating and covering substrates of the most diverse kind and in any desired form, such as sheets, fibres, fibre fleeces, wires, grid-like structures, fabrics and foams. Suitable substrates include metals, such as copper, brass, aluminium, iron and steel; asbestos and glass fibre materials; polymers, such as cellulosic materials (e.g. cellulose esters or cellulose ethers, and paper); perfluorocarbon polymers, such as polytetrafluoroethylene; polyolefines, polyesters, polyamides, polyimides, polyurethanes and the like.

EXAMPLE 1

23.8 g of polyamide, consisting of the condensation product of isophthalic acid and m-phenylenediamine, are introduced into a solution of 210 g of bis-trimethylsilylacetamide (molar proportion 1:12) and 350 ml of dimethylacetamide and the mixture is stirred at room temperature until a clear viscous solution results. Thereafter, excess silylating agent and dimethylacetamide are removed at 50°–100°C/1 mmHg. The residue consists of practically completely silylated polyamide in the form of a viscous paste which dissolves, for example, in benzene, tetrahydrofurane, chloroform and methylene chloride. The N-trimethylsilyl groups of the resulting polyamide are very sensitive to hydrolysis and are rapidly and quantitatively split off by proton-donating compounds, such as water or alcohols, whereupon the original, sparingly soluble polyamide is again formed.

If an approx. 20 percent by weight solution of the silylated polyamide in methylene chloride is passed at room temperature through a nozzle (diameter of spinning nozzles 0.125 mm) into a methanol precipitation bath, fibres are obtained which have the same softening point as the polyamide originally employed.

EXAMPLE 2

23.8 g of polyamide, consisting of the condensation product of isophthalic acid and m-phenylenediamine, are heated in the presence of 0.5 g of ammonium sulphate with 108 g of N,N-diethyltrimethylsilylamine in 250 ml of dimethylacetamide to 160°C over the course of 30 minutes, during which time the diethylamine liberated distils off and the silylated polyamide dissolves.

The silylated polyamide obtained can be worked up analogously to Example 1. However, it is also possible to precipitate the reaction product, in a known manner in acetonitrile, diethyl ether or petroleum ether, to dry the precipitated silylated polyamide if desired, and to dissolve it in methylene chloride and spin it in the usual manner into a methanol bath.

EXAMPLE 3

A solution of 20.02 g of bis-(4-aminophenyl)-ether in 250 ml of dimethylacetamide is first introduced into a cylindrical glass vessel of about 1 litre capacity. 21.81 g of pure pyromellitic dianhydride are added in portions to this solution, under a nitrogen atmosphere and whilst stirring constantly, the temperature of the reaction mixture being kept at approx. 20°C by means of a cooling bath. After stirring for two hours at 20°C, a highly viscous polyamide acid solution (PAA solution) has formed, which has an inherent viscosity ($\eta_{inh.}$) of 1.30 dl/g(0.5% by weight polymer in a 3% by weight solution of lithium chloride in dimethylacetamide at 25°C). A four-fold equimolar amount (81.2 g) of bis-trimethylsilylacetamide is added to the resulting polyamide-acid solution at room temperature. A persilylated polyamide-acid solution is obtained, in which both the two carboxyl protons and the two amide protons are replaced by trimethylsilyl radicals, as is shown by the infrared spectrum of the solution of the persilylated polyamide-acid which has been precipitated in petroleum ether.

The solution of the persilylated polyamide-acid obtained according to paragraph 1 of the above example can be converted into films in a known manner, whilst excluding atmospheric moisture or even without this-measure if working rapidly, by casting the polyamide-acid solution on a glass plate and first largely freeing it of solvent at about 85°C/1 mm Hg, and subsequently heating the films for approx. two hours to 220°–250°C/1 mm Hg. The secondary product (trimethylsilylacetamide) originating from the silylating agent is thereby driven off and practically quantitative intramolecular cyclisation of the persilylated polyamide-acid to give the corresponding silicon-free polypyromellitimide takes place.

EXAMPLES 4–7

If in Example 3, whilst otherwise using the same procedure, dimethylformamide or N-methylpyrrolidone are used as the solvent instead of dimethylacetamide, and the 81.2 g of bis-trimethylsilylacetamide are replaced by equivalent amounts of bis-trimethylsilylformamide, N-methyl-N-trimethylsilylacetamide, bis-trimethylsilylbenzamide or tetrakis(trimethylsilyl)oxamide, silylated polyamide-acids with similar properties are obtained, which are above all suitable for the manufacture of films, foams and coating compositions in accordance with processes which are in themselves known. Advantageously, a small excess of silylating agent is used in order thereby to remove any traces of water which may be present in the reaction system.

EXAMPLES 8–13

Instead of persilylating the polyamide-acid solution manufactured according to paragraph 1, Example 3, directly with bis-trimethylsilylacetamide, it is also possible first to silylate the carboxyl protons by means of one of the silylating agents listed below and subsequently to silylate the amide protons with bis-trimethylsilylacetamide in the manner described in Example 3:

| Example No. | Silylating agent |
|---|---|
| 8 | Trimethylchlorosilane |
| 9 | Trimethoxychlorosilane |
| 10 | Triphenoxychlorosilane |
| 11 | N,N-Bis(trimethylsilyl)aniline |
| 12 | N-Trimethylsilylpyrrolidone |
| 13 | N,N'-Diphenyl-N,N'-ditrimethylsilylurea |

If halides are used for silylating the carboxyl protons, the reaction is advantageously carried out in the presence of triethylamine or of another HCl acceptor.

EXAMPLE 14

A solution of a polyamide-acid is manufactured in accordance with Example 3, paragraph 1, and after completion of the reaction a solution of 0.34 g of pyromellitic dianhydride in 15 ml of dimethylacetamide is further added to the reaction mixture at 20°C, whilst stirring. Hereupon, the viscosity of the solution rapidly rises and after stirring for two hours reaches a value of $\eta_{inh.} = 2.9$ dl/g (0.5% by weight polymer in a 3% by weight solution of lithium chloride in dimethylacetamide at 25°C). The resulting solution, which barely still flows, is then treated at 20°C, whilst stirring well, with a four-fold equimolar amount (81.2 g) of bis-trimethylsilylacetamide dissolved in 20 ml of tetrahydrofurane or cyclohexanone. The silylation already starts during mixing and is complete after a few minutes, which can be recognised from a noticeable drop in the viscosity. Polyimide films can be manufactured from the silylated polyamide-acid solution in the manner described in Example 3.

The above silylated polyamide-acid solution can also be used for the manufacture of wire enamel, by dipping copper wire into the solution, allowing it to drain and then stoving firstly for 2 hours at 100°C and then for one hour at 190°C. This process is repeated once more, after which the wire enamel is further cured for 15 hours at 250°C.

EXAMPLE 15

A solution of a silylated polyamide-acid is manufactured according to paragraph 1 of Example 3. On introduction into petroleum ether (boiling point approx. 150°–250°C), the persilylated polyamide-acid precipitates as a rubbery mass which still contains included traces of solvent. In contrast to the non-silylated polyamide-acid, the silylated compound for example dissolves in tetrahydrofurane, dioxane, cyclohexanone, chloroform and butyl acetate. Appropriately concentrated, viscous solutions of the silylated polyamide-acid in these solvents (for example 40–60 percent by weight solutions, depending on the degree of polymerisation) can be converted in a known manner, with exclusion of atmospheric moisture, into films which after stripping off the relatively low-boiling solvent are converted into polyimide films by heating to 100°–250°C/1–20 mm Hg for about two hours. Fibres can also be manufactured from the above silylated polyamide-acid solution by spinning the solution in a hot air tunnel at temperatures of between 200° and 250°C.

In the above example, it is also possible, for example, to replace the petroleum ether by the double lower alkyl ethers of ethylene glycol and its oligomers as a precipitant for the persilylated polyamide-acid.

EXAMPLE 16

0.5 g (2.10 × 10$^{-3}$ mol) of poly-(m-phenyleneisophthalamide) [$\eta_{inh.} = 1.64$ dl/g, 0.5% by weight polymer in a 3 percent by weight solution of lithium chloride in N-methylpyrrolidone at 25°C] are suspended in a mixture of 25 ml of absolute dimethylacetamide and 3.081 g of N,N-diethyl-trimethylsilylamine with the addition of 0.041 g of ammonium sulphate as the catalyst. The reaction mixture is warmed to 170°–180°C under dry nitrogen, whilst stirring, whereupon the partially silylated polyamide dissolves over the course of 30 minutes, giving a yellow colour. After stripping off the solvent in a high vacuum, the resulting partially silylated polymer residue is soluble in 10 ml of absolute dimethylacetamide.

EXAMPLE 17

If in Example 16, whilst otherwise using the same procedure, the N,N-diethyl-trimethylsilylamine is used in 15-fold excess over the stoichiometrically required amount, a practically completely, (100%) silylated polyamide is obtained, which dissolves, for example, in tetrahydrofurane or methylene chloride.

The resulting persilylated poly-(m-phenyleneisophthalamide) can be used, for example as follows, for the coating of copper and iron sheets:

A copper sheet (0.5 × 30 × 150 mm) and an iron sheet (0.3 × 30 × 150 mm) are each degreased with acetone. The copper sheet is additionally introduced for 1 hour, at room temperature, into an iron chloride pickle and is subsequently first thoroughly rinsed with water and then with acetone, and dried.

A 20 percent by weight solution of the abovementioned persilylated poly-(m-phenyleneisophthalamide) in methylene chloride is separately prepared. The copper sheet and the iron sheet are successively briefly dipped into the solution, whilst excluding moisture, after which the solvent is stripped off whilst excluding moisture. Clear coatings which turn cloudy in moist air (72 percent relative atmospheric humidity) are obtained on both sheets. The sheets are left hanging in air overnight. Hereupon, trimethylsilanol is formed, and is removed in a vacuum oven at 60°C/25 mm Hg. The dried coatings show good adhesion to the copper sheet and iron sheet, are solvent-resistant and further show good flexural strength.

EXAMPLE 18

0.507 g of poly-(m-phenylene-isophthalamide) (2.13 × $10^{-3}$ mol) are suspended in a mixture of 50 ml absolute dimethylacetamide and 9.126 g of N-methyl-N-phenyl-trimethylsilylamine with the addition of 0.035 of ammonium sulphate as the catalyst. The reaction mixture is warmed to 80°C whilst excluding moisture and stirring. Hereupon, the polyamide dissolves over the course of approx. 8 hours, to give a yellow colour. After removing the solvent, the excess silylating agent and the ethylaniline formed during the silylation, the practically completely silylated polyamide can be dissolved in 10 ml of anhydrous methylene chloride at room temperature to give a clear solution.

In the above example, instead of using 50 ml of absolute dimethylacetamide, equivalent amounts of N-methylpyrrolidone or hexamethyl-phosphoric acid triamide (hexametapol) can also used as the solvent with equal success.

EXAMPLE 19

If in Example 18, whilst otherwise using the same procedure, only half the silylating agent is used, a partially silylated polyamide is obtained which is now only partially soluble in methylene chloride but is completely soluble in tetrahydrofurane and dimethylformamide.

EXAMPLE 20

0.13 g (0.55 × $10^{-3}$ mol) of poly-(m-phenylene-isophthalamide) are suspended in a mixture of 20 ml of absolute dimethylacetamide and 9.19 g of N,N-diphenyl-trimethylsilylamine with the addition of 0.012 g of ammonium sulphate as the catalyst. The reaction mixture is protected against atmospheric humidity and is warmed to 130°–140°C whilst stirring, whereupon the polyamide dissolves over the course of 30 minutes to give a yellow colour. After removing the solvent in vacuo, a light yellow, semi-solid residue is obtained which apart from the polymer and excess reagent still contains the diphenylamine formed during the silylation reaction. The reaction product gives a clear solution in 20 ml of absolute methylene chloride.

If in the above example, whilst otherwise following the same procedure, the amount of the silylating agent employed is reduced, a polyamide with a correspondingly lower degree of silylation is obtained, which is still readily soluble in dimethylformamide, dimethylacetamide and N-methylpyrrolidone.

The silylated polyamide can be converted into the silicon-free polyamide by treatment with methanol or a mixture of methanol and water or by means of atmospheric moisture. A comparison of the viscosities shows that no degradation has occurred during silylation and desilylation.

EXAMPLE 21

0.5 g (2.10 × $10^{-3}$ mol) of poly-(m-phenylene-isophthalamide), 20 ml of anhydrous dimethylacetamide, 4.0 g of bis-(trimethylsilyl)-sulphate and 3.6 g of anhydrous triethylamine are heated to 65°–80°C for 2 hours, whilst excluding atmospheric moisture. After cooling to room temperature, the solution is filtered through a glass frit and the solvent is distilled off at 0.01 mm Hg and a temperature of between 25°and 100°C. The resulting silylated polyamide is taken up in anhydrous methylene chloride and freed of undissolved triethylammonium sulphate by filtration.

EXAMPLE 22

Analogously to the description in Example 21, 0.5 g (2.1 × $10^{-3}$ mol) of poly-(m-phenylene-isophthalamide) are heated with 20 ml of anhydrous dimethylacetamide and 15 g of N,N-bis-(trimethylsilyl)-aniline for 3 hours to 100°–200°C, whilst excluding atmospheric moisture. After filtering the solution through a glass frit and removing the solvent, a partially silylated polyamide is obtained, which swells in methylene chloride and tetrahydrofurane but is easily soluble in more strongly polar solvents, such as dimethylacetamide and N-methylpyrrolidone.

EXAMPLE 23

0.5 g (2.10 × $10^{-3}$ mol) of poly-(m-phenylene-isophthalamide) are heated with 20 ml of anhydrous dimethylacetamide and 4.82 g of tetrakis-(trimethylsilyl)-oxamide for 1 hour to 90°–95°C, whilst excluding atmospheric moisture. The resulting colourless solution of the silylated polyamide is freed of the solvent at 0.001 mm Hg and a temperature of between 25° and 110°C, with the excess silylating agent and the bis-(trimethylsilyl)-oxamide formed during the reaction also finally subliming off. A colourless film of silylated polyamide is obtained, which is readily soluble in anhydrous methylene chloride and shows a softening point of 100°–120°C (Kofler heating bench).

Analysis: calculated: C 62.8%; H 6.85%; N 7.3%; Si 14.7%. found: C 63.5%; H 7.4%; N 6.97%; Si 14.5%.

EXAMPLE 24

20 g of poly-(m-phenylene-isophthalamide) ($\eta_{inh.}$ = 1.61 dl/g at c = 0.5 percent by weight polymer in a 3% by weight solution of lithium chloride in N-methylpyrrolidone at 25°C) are stirred with 350 ml of dimethylacetamide and 50 g of bistrimethylsilylacetamide (1.5 mols of silylating agent per mol of amide groups in the polyamide) for 30 minutes at 80°C, whilst excluding atmospheric moisture. A clear solution is produced, which is subsequently concentrated to approx. 50ml in vacuo and is then precipitated in diethyl ether in a domestic mixer, under dry nitrogen. The precipitated silylated polyamide is dried in vacuo at 130°–150°C. The dried, incompletely silylated polyamide (9.6% Si content instead of 14.7% Si) softens at approx. 200°C on the Kofler bench. For a melt spinning test, the dry, silylated polyamide is introduced, under nitrogen protection, into a micro-melt spinning apparatus and is spun at a pressure of 2 atmospheres, at 280°C, through a nozzle of 0.3 mm diameter to give filaments of which the thickness can be varied between 0.02 and 0.14 mm depending on the take-off speed. The filaments thus drawn from the melt can subsequently not be re-melted at 280°C, since they have been desilylated through contact with atmospheric moisture and hence been reconverted into the original poly-(m-phenylene-isophthalamide).

Analogously, polyamide strips or sheets can be manufactured from the melt if a slit die is used.

EXAMPLE 25

If in Example 24, whilst otherwise using the same procedure, an approximately 6-fold amount of silylating agent is employed, a clear solution of the persilylated polyamide is already obtained within 15 minutes at 80°C. After completely stripping off the solvent and the excess silylating agent, the silylated polyamide is left in the solid form. It can be dissolved in benzene or methylene chloride to give viscous solutions. The silylated polyamide can be precipitated in a flocculent form by pouring the solutions into ether or acetonitrile. After drying, the polyamide shows a silicon content of 13.7% (calculated, 14.7%). This practically completely silylated product softens at approx. 90° to 120°C on the Kofler bench and the melt can be converted analogously to Example 24, and in particular already at temperatures from 150°C onwards, to give fibres or films and the like.

After customary desilylation, the viscosity of the silicon-free polyamide agrees with that of the starting polyamide within the limits of error, thus proving that no degradation has occurred during silylation and desilylation.

The solutions of the persilylated polyamide in benzene or methylene chloride can be cast to give films, whilst excluding moisture. The clear films obtained after evaporation of the solvent are rapidly converted into silicon-free polyamide films when brought into contact with air.

EXAMPLE 26

2 g of a pulverulent poly-(m-phenylene-isophthalamide) (particle size 200 to maximally 500 $\mu$; $\eta_{inh.} = 0.6$ dl/g, 0.5 percent by weight polymer in a 3% by weight solution of lithium chloride in dimethylacetamide at 25°C) in 70 ml of hexametapol dissolve within 15 minutes at 80°C after addition of 5.7 g of bis-trimethylsilylacetamide (1.5 mols of silylating agent per mol of amide).

0.5 g of poly-(m-phenylene-isophthalamide) in 20 ml of N-methylpyrrolidone dissolve within 20 minutes at 120°C after addition of 1.7 g of bis-trimethylsilylacetamide (2-mols of silylating agent per mol of amide).

In both cases the silylated polyamide thus obtained is soluble in methylene chloride and can be spun to give fibres, in a known manner, by extrusion into a water/methanol precipitation bath.

EXAMPLE 27

1 g of poly-(m-phenylene-terephthalamide) ($\eta_{inh.} = 0.3$ dl/g, 0.5% by weight polymer in a 3 percent by weight solution of lithium chloride in N-methylpyrrolidone at 25°C) in 10 ml of dimethylacetamide is treated with 8.7 g of bis-trimethylsilylacetamide. After heating to 120°C, the polymer dissolves whilst in a blank experiment without silylating agent the polyamide remains undissolved. After cooling the solution to room temperature, the silylated polymer precipitates as a light-coloured powder; this is filtered off, and dried, whilst excluding moisture.

Analysis: found: C 63.4%; H 6.3%; N 7.7%; Si 14.1%. calculated: C 62.8%; H 6.8%; N 7.3%; Si 14.7%.

The silylated poly-(m-phenylene-terephthalamide) is soluble in tetrahydrofurane, dioxane, chlorobenzene and, in part, also in cyclohexane and can be converted, in a manner which is in itself known into fibres, films or sheets and ply structures, and be used for the coating of paper.

EXAMPLE 28

1 g of poly-(m-phenylene-isophthalamide) is covered with 50 ml of dimethylacetamide and 8.5 g of N-methyl-N-trimethylsilylacetamide are subsequently added to the whole. After stirring for approx. 2 hours at 80°–90°C, the polymer gives a clear solution. After stripping off the solvent and the excess silylating agent, the completely silylated polyamide is left in a solid form; it dissolves, for example, in methylenechloride. Examination of the viscosity of the regenerated silicon-free product shows that no degradation has occurred.

Poly-(m-phenylene-isophthalamide), educt $\eta_{inh} = 1.61 \pm 0.1$ dl/g Desilylated product $\eta_{inh} = 1.56 \pm 0.1$ dl/g (0.5 percent by weight polymer in a 3 percent by weight solution of lithium chloride in N-methylpyrrolidone at 25°C). If, in the above example, a lesser excess of N-methyl-N-trimethylsilylacetamide is used, the poly-(m-phenylene-isophthalamide) is, under certain circumstances, no longer sufficiently dissolved.

15 g of a poly-(m-phenylene-isophthalamide) fibre (fibre diameter approx. 15 $\mu$) are partially dissolved at 90°C by means of 125 ml of dimethylacetamide and 29 g of N-methyl-N-trimethylsilylacetamide. The resulting solution is highly viscous and very cloudy and shows a strong Tyndall effect. The solution is stirred into dry acetonitrile under nitrogen protection, whereupon the polymer precipitates. It is filtered off and dried in vacuo at approx. 120°C. The silylated polymer has a silicon content of 7.1 percent (calculated, 14.7 percent) and softens from approx. 260°C onwards on a Kofler bench.

About 0.5 g of this silylated polymer is packaged airtight between two aluminum foils and then pressured in a press at 280°C and 30,000 psi pressure for 3 minutes to give approx. 0.2 mm thick sheets. The sheets are yellowish and clear and still show a fleece of the original fibres under a microscope with crossed Nicol prisms. This indicates that a part of the fibres has not dissolved but only been dissolved superficially and swollen. The sheets remain clear both in air and in water.

EXAMPLE 29

1 g of poly-(m-phenylene-isophthalamide) is added to 100 ml of dimethylacetamide and dissolved at 80°C, with the addition of 4.1 g of bis-trimethylsilylbenzamide (corresponding to 1.5 mols of silylating agent per mol of amide), with exclusion of moisture, to give a clear solution. Thereafter, the solvent and the excess silylating agent are stripped off and the residue is dissolved in a small amount of anhydrous cyclohexane. After approx. 12 hours the resulting N-trimethylsilyl-benzamide has crystallised out practically quantitatively and can be filtered off. Concentration yields a viscous solution from which fibres can be manufactured by the customary extrusion into isopropanol.

After pouring the above cyclohexane solution onto a glass plate whilst excluding moisture, a film is obtained, with the aid of a film-drawing frame, which after removal of the solvent in air is converted, with rapid hydrolysis of the N-silyl groups, into a strong, clear polyamide film.

EXAMPLE 30

Poly-(m-phenylene-terephthalamide) is silylated with bistrimethylsilylbenzamide in dimethylacetamide in the manner described in Example 29. After cooling the reaction solution, the silylated polyamide precipitates (silicon content: calculated 14.7 percent, found 14.3 percent). The silylated polyamide is soluble, for example, in chlorobenzene, dioxane, tetrahydrofurane and cyclohexane.

EXAMPLE 31

Poly-(m-phenylene-isophthalamide) is rapidly and completely silylated with bis-trimethylsilyl-p-methoxybenzamide in dimethylacetamide, N-methylpyrrolidone or hexamethylphosphoric acid triamide at 80°–100°C, in the manner described in Example 29. Precipitation in acetonitrile yields a silylated polyamide which is soluble, for example, in methylene chloride and cyclohexane. Elementary analysis shows the expected silicon content of 14.6± 0.1 percent. The persilylated polyamide softens at 80°C on the Kofler bench.

For pressing the polymer, approx. 0.5 g thereof is packaged air-tight between two aluminum foils. Pressing takes place in a preheated press at 100°C for 3 minutes under a pressure of 30,000 psi, using a 2 mm high frame. A clear, yellowish, homogeneous sheet of 1.8 mm thickness is obtained, which still softens at 80°C. On immersion into water at 22°C, the plate turns cloudy over the course of 24 hours and is desilylated to a residual silicon content of 6.3% Si. The softening point, determined from penetration measurements on a thermomechanical analyser, is now 275°C.

The trimethylsilyl groups bonded to the amide nitrogen can also be split off thermally. In this way, foams can be manufactured from the silylated polymer, for example as follows:

Firstly, a sheet of silylated poly-(m-phenyleneisophthalamide) is manufactured as described above. A punched-out strip of 10 mm width, 50 mm length and 1.7 mm thickness is superficially desilylated by brief contact with water. This strip of silylated polyamide is placed in a steel press mould of internal dimensions 10 × 50 mm and the punch is only introduced loosely. The close press mould is now immersed in a silicone oil bath which is heated to 220°C over the course of 40 minutes. This temperature is maintained for 15 minutes; the mould is then removed from the bath and allowed to cool. The polymer has foamed up to 4.2 mm but is externally enclosed by a solid skin. A cross-section through the foam shows cells of different diameters up to a maximum of about 1 mm. The foam is tough and, for example, no longer dissolves in dimethylacetamide or N-methylpyrrolidone with added lithium chloride. Correspondingly more strongly foamed foams can be manufactured by varying the temperature and the duration of the heat treatment.

EXAMPLES 32 AND 33

If in Example 31, whilst otherwise using the same procedure, the poly-(m-phenylene-isophthalamide) is replaced by poly-(m-phenylene-terephthalamide) or poly-(p-phenyleneterephthalamide), extensively silylated polyamides are obtained, and, for example, the m-p-linked product dissolves in tetrahydrofurane, dioxane or chlorobenzene.

Analysis of p-p-linked product:
Calculated: C 62.8%; H 6.8%; N 7.3%; Si 14.7%.
Found: C 62.4%; H 6.7%; N 7.1%; Si 12.7%.

EXAMPLES 34 AND 35

5g of poly-(m-phenylene-isophthalamide) are silylated by adding 32 g of bis-trimethylsilyltrifluoroacetamide in 50 ml of dimethylacetamide and warming to 80°C for 30 minutes (molar proportion of silylating agent: amide groups = 3.1). The resulting solution of the silylated polyamide can be directly converted, as described in the preceding examples, into silicon-free polyamide fibres or clear films. A different form of working up is first to strip off the solvent, excess silylating agent and trimethylsilyltrifluoroacetamide formed during the reaction, to take up the residual solid silylated polyamide in methylene chloride or benzene and to convert these solutions into fibres or films which in the presence of atmospheric moisture are rapidly converted into the silicon-free polyamide. The trimethylsilanol thereby liberated already evaporates off rapidly at room temperature or can be removed by rinsing the films or fibres in a solvent bath, for example acetone, methylene chloride or butyl acetate.

Solutions of the silylated polyamide in dimethylacetamide, N-methylpyrrolidone, methylene chloride, chloroform, benzene or other inert organic solvents can also be used for laminating glass fibres or carbon fibres or for coating articles. In this case, again, the silicon-free polyamide, with its known good properties, is rapidly re-formed under access of atmospheric moisture or on introduction into a methanol bath, steam bath or water bath.

In the example given, poly-(m-phenylene-terephthalamide) can also be used under the same conditions, instead of poly(m-phenylene-isophthalamide).

EXAMPLE 36

10 g of poly-(m-phenylene-isophthalamide) are covered with 200 ml of dry dimethylacetamide and then treated with 25 g of bis-trimethylsilylacetamide (molar proportion of silylating agent: amide groups = 1.5:1). On gentle stirring for 20 minutes at 80°C, the polymer gives a clear solution. The solvent is stripped off in vacuo until the solids content of the solution is approx. 10 percent. A clear, viscous solution of the silylated polyamide is obtained, from which films can be manufactured when working rapidly, without special protective measures against access of atmospheric moisture, by spreading the solution rapidly on glass plates by means of a so-called quadruple film-drawing frame, and drying the films overnight in a vacuum oven at 100°–150°C/80 mm Hg. Using a slit height of 100 $\mu$, approx. 10 $\mu$ thick, glass-clear films are thereby obtained. With a slit height of 250 $\mu$, films of 25–30 $\mu$ thickness are obtained. The tensile strength of the unstretched silicon-free films was determined on 15 samples in accordance with DIN Standard Specification 53,371 and gave the following results: 13.4± 0.3 kg/mm². In comparison thereto, a film manufactured from non-silylated polyamide has a tensile strength of 8.5 kg/mm².

The solution of the silylated poly-(m-phenyleneisophthalamide) in dimethylacetamide, obtained in accordance with the above example, can also be used in the customary manner for coating paper, in which case the coating of silylated polyamide, after removal of the solvent, is preferably converted into the silicon-free coating by prolonged action of atmospheric moisture.

EXAMPLE 37

60 g of acetamide are dissolved in 500 ml of dimethylacetamide and 360 ml of triethylamine at room temperature. 270 g of trimethylchlorosilane are added to this solution whilst cooling, whereupon a voluminous precipitate of triethylamine hydrochloride is produced, which is filtered off. 5 g of poly-(m-phenyleneisophthalamide) are now warmed in this filtrate to 80°–100°C, under nitrogen and whilst stirring. The polymer dissolves over the course of 4 hours. This solution can, analogously to the preceding examples, either be evaporated to dryness in vacuo or be precipitated in a precipitation bath, for example in acetonitrile, or be directly converted into filaments or sheets by extrusion, for example into 80% aqueous isopropanol.

EXAMPLE 38

6.219 g of pyromellitic dianhydride are reacted with 5.706 g of 4,4'-diaminodiphenyl-ether in 120 ml of dimethylacetamide analogously to Example 3, and the product is subsequently persilylated with 17.7 g of bis-trimethylsilylacetamide. After adding a mixture of 5.7 g of acetic anhydride and 2.2 ml of pyridine (volume ratio of anhydride:pyridine = 2:1), the cyclisation to give the polyimide already starts at room temperature and can be accelerated by warming the reaction mixture to about 50°C. The silicon-free polyimide which precipitates can be isolated by filtration and be largely freed of the solvent and the other reagents by washing with methanol and subsequently drying in vacuo.

EXAMPLE 39

6.219 g of pyromellitic dianhydride are reacted with 5.706 g of 4,4'-diaminodiphenyl-ether in 120 ml of N-methylpyrrolidone, analogously to Example 3. Thereafter, the carboxyl groups of the resulting polyamide-acid are silylated by adding stoichiometric amounts of trimethylsilylacetamide (6.7 g) and the reaction product is precipitated in tetrahydrofurane. The reaction product which has precipitated is then taken up in fresh tetrahydrofurane and the amide protons are silylated by adding 12 g of bis-trimethylsilylacetamide. A viscous, clear solution of the persilylated polyamide-acid in tetrahydrofurane is obtained, which can be used, in a manner which is in itself known, for casting films.

EXAMPLES 40–47

If in Example 39, whilst otherwise following the same procedure, equivalent amounts of one of the silylating agents listed below are used for silylation of the carboxyl groups in place of 6.7 g of trimethylsilylacetamide, and the silylation of the amide protons is subsequently carried out as indicated in Example 39, persilylated polyamide-acids having similar properties are obtained:

| Example No. | Silylating agent |
|---|---|
| 40 | Trimethylchlorosilane |
| 41 | Trimethoxychlorosilane |
| 42 | Triethylchlorosilane |
| 43 | Triphenylchlorosilane |
| 44 | Triphenoxychlorosilane |
| 45 | N,N-Bis-(trimethylsilyl)-aniline |
| 46 | N-Trimethylsilylpyrrolidone |
| 47 | N,N'-Diphenyl-N,N'-ditrimethylsilylurea |

If halides are used for silylating the carboxyl protons, the reaction is advantageously carried out in the presence of triethylamine or some other HCl acceptor. Since the above silylating agents are not capable of silylating amide-protons under the reaction conditions indicated, they can optionally also be used in excess.

EXAMPLE 48

6.219 g of pyromellitic dianhydride are reacted with 5.549 g of 4,4'-diaminodiphenylmethane in 120 ml of N-methylpyrrolidone, analogously to Example 3. A highly viscous polyamide-acid solution ($\eta_{inh.}$ = 1.35 dl/g, 0.5% by weight polymer in a 3% by weight solution of lithium chloride in N-methylpyrrolidone at 25°C) is thereby produced. Addition of 5.68 g of bis-trimethylsilylacetamide (1.1 mols of silylating agent per polyamide unit) first yields the polyamide-acid silylated at the carboxyl groups and after further addition of 12.5 g of bis-trimethylsilylacetamide (2.2 mols of silylating agent per polyamide unit) this acid is converted into the persilylated polyamide-acid having a distinctly lower viscosity. After precipitation in acetonitrile or petroleum ether, the persilylated polyamide-acid is soluble, for example, in benzene, toluene, cyclohexanone or methylene chloride.

If, in the above example, the amount of bis-trimethylsilylacetamide employed for the silylation of the amide protons is reduced to the point that only about one amide group in every fifth polyamide-acid structural unit is silylated, a polyamide-acid solution is obtained which is stable for a prolonged period and does not change in viscosity. The polyamide-acid, which can be precipitated in benzene or acetonitrile, will, for example, already dissolve in tetrahydrofurane or cyclohexanone and can also be further used in the form of such solutions, in the usual manner.

EXAMPLES 49–52

If in Example 48, section 1, whilst otherwise following the same procedure, equivalent amounts of one of the diamines listed below are used instead of 5.549 g of 4,4'-diaminodiphenylmethane, persilylated polyamide-acids having similar properties are obtained:

| Example No. | Diamine |
|---|---|
| 49 | Benzidine |
| 50 | p-Phenylenediamine |
| 51 | m-Phenylenediamine |
| 52 | 4,4'-Diaminodiphenylsulphone |

EXAMPLE 53

Analogously to Example 3, 9.021 g of 3,3',4,4'-benzophenone-tetracarboxylic dianhydride are reacted with 5.706 g of 4,4'-diaminodiphenyl-ether in 120 ml of N-methylpyrrolidone. This produces a highly viscous polyamide-acid solution ($\eta_{inh.}$ = 1.2 dl/g, 5 percent by weight polymer in a 3 percent by weight solution of lithium chloride in dimethylacetamide at 25°C). Addition of 6.1 g of bis-trimethylsilylacetamide (1.1 mols of silylating agent per polyamide unit) first yields the polyamide-acid silylated at the carboxyl groups, and this is converted into the persilylated polyamide-acid by addition of a further 11.9 g of bis-trimethylsilylacetamide (2.1 mols of silylating agent per polyamide unit). The latter acid shows a distinctly lower viscosity than the non-silylated polyamide-acid or the polyamide-acid which has only been silylated at the carboxyl groups. After precipitation in petroleum ether, the persilylated polyamide-acid is soluble, for example, in tetrahydrofurane, benzene, cyclohexanone or chloroform. Such solutions of the persilylated polyamide-acid can be converted into films in the manner described in Example 3.

If, in the above example, the 120 ml of N-methylpyrrolidone are replaced by equivalent amounts of dimethylacetamide or dimethylformamide or solvent mixtures which consist, up to one-third, of benzene, toluene, xylene, tetrahydrofurane, dioxane or cyclohexanone, whilst the remainder consists of dimethylacetamide or dimethylformamide, persilylated polyamideacids having similar properties are obtained.

If, in the example mentioned, the amount of bis-trimethylsilylacetamide employed for the silylation of the amide protons is reduced to the point that only about one amide group in every twentieth polyamide structural unit is silylated, a polyamide solution is obtained which is stable for a prolonged period and does not change in viscosity.

EXAMPLE 54

5.894 g of 4-chloroformyl-phthalic anhydride are added to a solution of 5.706 g of 4,4'-diaminodiphenyl-ether in 50 ml of dry dimethylacetamide whilst stirring and excluding moisture, the mixture being cooled with an ice bath at the same time. After complete dissolution of the anhydride, the ice bath is removed and the reaction mixture is stirred for a further 3 hours at room temperature. 3.4 g of trimethylsilylacetamide are then added to the resulting viscous reaction solution (inherent viscosity of the polymer = 1.6 dl/g, 0.5 percent by weight polymer in a 3 percent by weight solution of lithium chloride in dimethylacetamide at 25°C), followed by 12 g of bis-trimethylsilylacetamide after a further 15 minutes. After stripping off the solvent and the other reactants, the resulting persilylated polyamide-acid amide can be converted, by heating for one hour to 100°–200°C with exclusion of moisture, into the corresponding polyamide-imide of which the amide groups are still silylated. The silylated polyamide-imide dissolves, for example, in benzene, toluene, tetrahydrofurane, cyclohexanone and methylene chloride, and has a softening point of approx. 90°C, which permits thermoplastic processing. After processing, for example into films, the N-silyl groups can be split off by the action of atmospheric moisture or by introducing the polymer into water, alcohol or other proton donors, thereby obtaining silicon-free polyamide-imides.

The solution of the silylated polyamide-acid amide in dimethylacetamide can also first be precipitated in petroleum ether. The precipitated polyamide-acid amide dissolves, for example, in benzene, toluene, tetrahydrofurane, cyclohexanone or methylene chloride. Converting these solutions in the presence of atmospheric moisture, for example into films, laminates or wire enamels, directly yields the silicon-free polyamide-imide after removal of the solvent and heating for about one hour to 100°–150°C. If the temperature is raised to 200°–250°C, practically quantitative cyclisation of the amide-acid groups to imide groups is already achieved after about 15 minutes.

EXAMPLE 55

A solution of 5.7 g of 4,4'-diaminodiphenyl-ether in 10 ml of N-methylpyrrolidone is added to a solution of 6.2 g of pyromellitic dianhydride in a mixture of 10 ml of N-methylpyrrolidone and 5 ml of toluene whilst stirring and cooling to 10°–20°C. The resulting highly viscous reaction mixture is then stirred for about 1 hour at room temperature, after which firstly 7.8 g of trimethylsilylacetamide and, after a further 10 minutes, a solution of 6.1 g of bis-trimethylsilylacetamide in 5 ml of N-methylpyrrolidone are added. A noticeable reduction in viscosity rapidly takes place. The reaction solution thus obtained still has very good flow and good processability at a concentration of about 22–24 percent by weight and can be used, for example, for laminating glass fibre fabrics in a manner which is in itself known.

EXAMPLE 56

5 g of a so-called regular copolyamide of N,N'-m-phenylene-bis-(m-aminobenzamide) and isophthalic acid chloride ($\eta_{inh.}$ = 1.05 dl/g at $c$ = 0.5 percent by weight polymer in a 3 percent by weight solution of lithium chloride in N-methylpyrrolidone at 25°C), of the formula

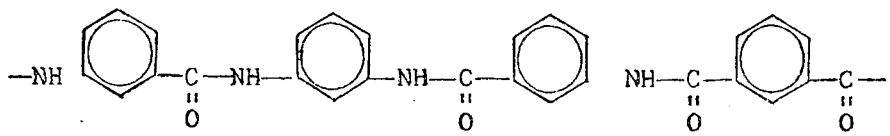

are dissolved in 70 ml of dry dimethylacetamide through silylation with 40 ml of bis-trimethylsilylacetamide at 120°C over the course of 40 minutes. The solution is then concentrated to approx. 35 ml in a high vacuum and is then spread on glass plates by means of a spiral film-drawing instrument (200 $\mu$), to give films. These are immediately introduced into a vacuum oven and dried at 80 mm Hg by slowly heating to 150°C overnight. The next day, the films are soaked in water for approx. 2 hours and then again dried. Clear, tough films are obtained, which do not soften up to 350°C.

EXAMPLE 57

2 g of a copolyamide manufactured from 70 mol% of diaminodiphenyl-ether, 30 mol% of m-phenylenediamine and equivalent amounts of isophthalic acid chloride are dissolved in 50 ml of dimethylacetamide over the course of 2 hours at 80° – 100°C through adding 25 ml of bis-trimethylsilylacetamide. The silylated polymer is obtained in the form of soft flakes by precipitating this solution in 750 ml of absolutely dry petroleum ether. These flakes can be redissolved in methylene chloride or tetrahydrofurane and converted, from these solutions, into filaments or films, or can also be used, for example, for enamelling copper wires.

We claim:

1. Process for making a polyamide or polyamide-acid polymer which contains N-silyl groups, is souble in organic solvents, has an inherent viscosity at a concentration of 0.5 percent by weight in N,N-dimethylformamide, N,N-dimethylacetamide or N-methylpyrrolidone, measured at 25°C, of 0.1 to 4.0 dl/g, said polymer having a recurring structural unit of formula I

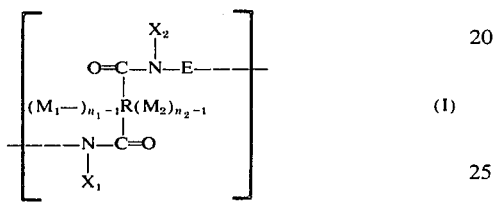

in which
- R represents a radical which possesses at least one 5-membered or 6-membered cycloaliphatic, carbocyclic-aromatic or heterocyclic ring, with the carbonyl groups being directly bonded to different ring carbon atoms,
- $X_1$ and $X_2$ independently of one another represent hydrogen or a group of the formula

with $R_1$, $R_2$ and $R_3$ independently of one another each denoting an alkyl of 1 to 4 carbon atoms, a cycloalkyl, aryl or aralkyl radical,
at least one of the radicals $X_1$ and $X_2$ in at least one of said structural units of formula I being

$M_1$ and $M_2$ denote a group of the formula

and are each located on a ring carbon atom adjacent to the carbonamide group, $R_1$, $R_2$ and $R_3$ having the meanings given above,
$n_1$ and $n_2$ independently of one another denote the number 1 or 2, and
E denotes a divalent carbocyclic-aromatic or heterocyclic-aromatic radical, an aliphatic radical with at least 2 carbon atoms, a cycloaliphatic or aliphatic radical, or, if $n_1$ and/or $n_2$ is the number 2, the corresponding partially cyclised imide, characterised in that a polyamide or a polyamide-acid having the recurring structural unit of formula II

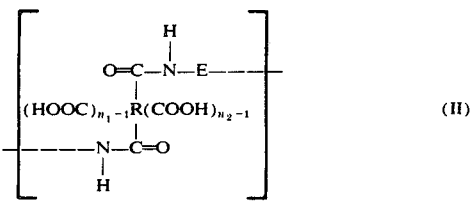

wherein
R, E, $n_1$ and $n_2$ are as defined under formula I, and the —COOH groups are each located on a ring carbon atom adjacent to the carbonamide group,
or, if $n_1$ and/or $n_2$ is the number 2, the corresponding partially cyclised imide, is reacted, at a temperature of from about 0°C to 200°C, a. with a silylating agent introducing radicals of the formula

into the —COOH and —CONH groups, in an amount sufficient to silylate any —COOH groups present and at least one —CONH group in at least one of said structural units of formula II, said silylating agent being of formula XV

wherein
$R_1$, $R_2$ and $R_3$ have the meanings given under formula I,
P represents the number 1, 2 or 4,
$Z_1$, if p is the number 1, represents

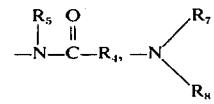

or

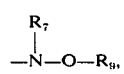

or, if p is the number 2,
$Z_1$ represents

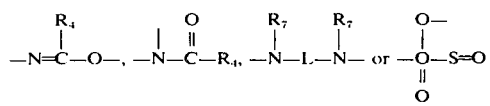

or, if p is the number 4, $Z_1$ represents $$-N=\overset{-O}{\underset{}{C}}-\overset{O-}{\underset{}{C}}=N- \text{ or } -N-\overset{O}{\underset{\|}{C}}-\overset{O}{\underset{\|}{C}}-N-,$$

with
- $R_4$ denoting hydrogen, trifluoromethyl, an alkyl of 1 to 4 carbon atoms, a cycloalkyl, aryl or aralkyl radical,
- $R_5$ denoting hydrogen, an alkyl of 1 to 4 carbon atoms, a cycloalkyl, aryl or aralkyl radical,
- $R_7$ and $R_8$ independently of one another denoting hydrogen, an alkyl of 1 to 4 carbon atoms, a cycloalkyl, aryl or aralkyl radical or $$a -\underset{\underset{R_3}{|}}{\overset{\overset{R_1}{|}}{Si}}-R_2$$

radical,
- $R_9$ denoting alkyl of 1 to 4 carbon atoms, a cycloalkyl, aryl or aralkyl radical or a $$-\underset{\underset{R_3}{|}}{\overset{\overset{R_1}{|}}{Si}}-R_2$$

radical, and
- L denoting phenylene or alkylene with 2 to 10 carbon atoms, or b. if $n_1$ and/or $n_2$ is the number 2, first with a silylating agent introducing radicals of the formula $$-\underset{\underset{R_3}{|}}{\overset{\overset{R_1}{|}}{Si}}-R_2$$

into the —COOH groups, in an amount sufficient to silylate all of the free carboxyl groups, said silylating agent being of formula XVI $$Z_2 \left[ \underset{\underset{R_3}{|}}{\overset{\overset{R_1}{|}}{Si}}-R_2 \right]_q \quad (XVI)$$

wherein
- $R_1$, $R_2$ and $R_3$ have the meanings given under formula I,
- $q$ represents the number of 1 or 2,
- $Z_2$, if $q$ is the number 1, represents halogen, or, if $q$ is the number 2,
$Z_2$ represents $$-N-\overset{\overset{R_9}{|}}{\underset{\underset{R_9}{|}}{C}}-N-,$$

with
- $R_9$ having the meanings given under formula XV,
- $R_{10}$ denoting an alkylene radical with 3 to 12 carbon atoms, and
- $R_{11}$ denoting an alkylene radical with 2 to 12 carbon atoms which alkylene radical may contain O or S atoms, and then reacting the resultant polymer with a silylating agent of formula XV, introducing radicals of the formula $$-\underset{\underset{R_3}{|}}{\overset{\overset{R_1}{|}}{Si}}-R_2$$

into the —CONH groups, in an amount sufficient to silylate at least one carbonamide group in at least one of said structural units of formula II.

2. Process according to claim 1, characterised in that bis-trimethylsilylacetamide or N-methyl-N-trimethylsilylacetamide is used as silylating agent of formula XV.

3. Process according to claim 1, characterised in that a polyamide-acid having the recurring structural unit of formula II is used in which
- R denotes the benzene ring of the benzophenone ring system,
- $n_1$ and $n_2$ denote the number 2, and
- E denotes a benzene ring, a 4,4'-diphenylsulphone or 4,4'-diphenylene radical.

4. Process according to claim 1, characterised in that a polyamide-acid having the recurring structural unit of formula II is used in which
- R denotes the benzene ring or the benzophenone ring system,
- $n_1$ and $n_2$ denote the number 2, and
- E denotes a 4,4'-diphenylyl-ether radical.

5. Process according to claim 1, characterised in that a polyamide-acid having the recurring structural unit of formula II is used in which
- R denotes the benzene ring,
- $n_1$ denotes the number 2,
- $n_2$ denotes the number 1, and
- E denotes a benzene ring, a 4,4'-diphenylylsulphone or 4,4'-diphenylylene radical.

6. Process according to claim 1, characterised in that a polyamide-acid having the recurring structural unit of formula II is used in which
- R denotes the benzene ring,
- $n_1$ denotes the number 2,
- $n_2$ denotes the number 1, and
- E denotes a 4,4'-diphenylyl-ether radical.

7. Process according to claim 1, characterised in that a polyamide having the recurring structural unit of formula II is used in which
- R and E each denote the benzene ring and
- $n_1$ and $n_2$ each denote the number 1.

* * * * *